(12) United States Patent
You et al.

(10) Patent No.: US 11,835,442 B2
(45) Date of Patent: Dec. 5, 2023

(54) FLOW IMAGING SYSTEM BASED ON MATRIX LASER SCANNING

(71) Applicant: TSINGHUA UNIVERSITY, Beijing (CN)

(72) Inventors: Zheng You, Beijing (CN); Yong Han, Beijing (CN); Jingjing Zhao, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 18/249,439

(22) PCT Filed: Sep. 14, 2021

(86) PCT No.: PCT/CN2021/118291
§ 371 (c)(1),
(2) Date: Apr. 18, 2023

(87) PCT Pub. No.: WO2023/035281
PCT Pub. Date: Mar. 16, 2023

(65) Prior Publication Data
US 2023/0288312 A1      Sep. 14, 2023

(30) Foreign Application Priority Data
Sep. 7, 2021 (CN) .......................... 202111044232.3

(51) Int. Cl.
*G01N 15/14* (2006.01)
*G01N 15/10* (2006.01)

(52) U.S. Cl.
CPC . *G01N 15/1434* (2013.01); *G01N 2015/1006* (2013.01); *G01N 2015/144* (2013.01)

(58) Field of Classification Search
CPC ....... G01N 15/1434; G01N 2015/1006; G01N 2015/144
See application file for complete search history.

(56) References Cited

U.S. PATENT DOCUMENTS

| 6,603,537 B1 | 8/2003 | Dietz et al. |
| 2007/0057211 A1 | 3/2007 | Bahlman et al. |

(Continued)

FOREIGN PATENT DOCUMENTS

| CN | 102906557 | 1/2013 |
| CN | 105717035 | 6/2016 |

(Continued)

OTHER PUBLICATIONS

CNIPA, First Office Action for CN Application No. 202111044232.3, dated Mar. 31, 2022.

(Continued)

*Primary Examiner* — David P Porta
*Assistant Examiner* — Meenakshi S Sahu
(74) *Attorney, Agent, or Firm* — Hodgson Russ LLP (57) ABSTRACT

A flow imaging system based on matrix laser scanning are provided. In the system, a beam splitter component modulates continuous laser generated by a laser source, and the continuous laser is focused on a focal plane by an illumination objective to form matrix spots. The matrix spots are irradiated on a single-cell axial flow of a fluid focusing component. When cells in the single-cell axial flow pass through the matrix spots, a fluorescent signal and a scattered light signal generated are received by a light collecting objective, and then sent to a photoelectric detector through a condenser. The photoelectric detector converts the fluorescence and scattered light signals excited into voltage signals, and the collecting card collects and converts the signals into digital signals, and sends the digital signals to a computer to be recovered through the computer, so as to obtain a cell image.

7 Claims, 8 Drawing Sheets

(56) References Cited

U.S. PATENT DOCUMENTS

| | | | |
|---|---|---|---|
| 2008/0277595 A1 | 11/2008 | Lundquist et al. | |
| 2011/0085219 A1 | 4/2011 | Yang et al. | |
| 2013/0200277 A1* | 8/2013 | Li | G01N 21/645 |
| | | | 250/206 |

FOREIGN PATENT DOCUMENTS

| | | |
|---|---|---|
| CN | 109188667 | 1/2019 |
| CN | 109946219 | 6/2019 |
| CN | 110146430 | 8/2019 |
| CN | 110226082 | 9/2019 |
| CN | 112255166 | 1/2021 |
| CN | 112858191 | 5/2021 |

OTHER PUBLICATIONS

CNIPA, Notification to Grant Patent Right for Invention for CN Application No. 202111044232.3, dated Aug. 3, 2022.

WIPO, International Search Report and Written Opinion for PCT/CN2021/118291, dated Feb. 24, 2022.

Zhao et al., "Key techniques in microfluidic flow cytometers," J Tsinghua Univ (Sci & Technol), 2018, vol. 58, No. 11.

* cited by examiner

FLOW IMAGING SYSTEM BASED ON MATRIX LASER SCANNING

CROSS-REFERENCE TO RELATED APPLICATIONS

The present application is a national phase entry under 35 U.S.C. § 371 of International Application No. PCT/CN2021/118291, filed Sep. 14, 2021, which claims priority to Chinese Patent Application No. 202111044232.3, filed Sep. 7, 2021, the entire disclosures of which are incorporated herein by reference.

FIELD

The present disclosure relates to a field of flow imaging technology, in particular to a flow imaging system based on matrix laser scanning.

BACKGROUND

Flow imaging is an imaging technology that images every cell in a high-speed flow cell to obtain a microscopic image. An imaging flow cytometry is an instrument for flow imaging, which solves a defect that traditional flow cytometry cannot obtain cell images, and may obtain more abundant cell morphological information, so as to be widely used in scientific research and clinical detection. According to different detectors, the imaging flow technology may be divided into two types, that is, an array-based detector and a single-point detector. Each type of imaging flow technology may be achieved in many different manners. The imaging manner based on an array detector adopts CCD or CMOS as a detecting device, such as, ImageStream series instrument of Amnis company, in which the core device is time delay integration CCD. However, in an application of high-throughput imaging where the cells move at a high speed is larger than 1 m/s, the array-based detector has problems of an insufficient frame rate, a low signal-to-noise ratio and a large data flow, which is hard to meet the imaging requirements. In view of the above-mentioned shortcomings, the imaging manner based on single-point detector is currently applicable to the high-throughput flow imaging. An imaging manner based on a spectral marking process and a time-stretching technology is an important imaging manner in the single-point detector mode. The spectral marking adopts a dispersion device to map the different wavelengths of the broad-spectrum light to different positions of the imaging sample, and the sample reflected light or the scattered light is subject to time-stretched through the dispersion fiber, thus separating the optical signal carrying the sample image information in the time domain. A single photomultiplier tube (PMT) is used for detection, and finally a reconstructed image is restored. Since a time stretching technology is adopted, the imaging manner is limited by a dispersion coefficient, so it is required to use a higher rate collecting card to complete data acquisition. Since the time-stretching technology needs to use the dispersion fiber with a length of km, the complexity and stability of the system are low. A compression sensing imaging mode excited by random structured light is also an important imaging manner based on the single-point detector, which adopts a static random illumination laser spot to irradiate cells. When the cells pass through the illumination area, the fluorescence signal excited contains the fluorescence distribution information of the cells. A compression sensing algorithm may be used to solve an inverse problem to obtain the cell image, or a machine learning process may be performed to directly recognize the original signal. Although the imaging manner may obtain high imaging flux, it costs a lot of time to solve the inverse problem because it cannot obtain the cell image directly, so its practicability is limited.

SUMMARY

In view of the technical problems of long time consumption, low reliability and limited practicability of a flow imaging process in the related art, the present disclosure seeks to provide a flow imaging system based on matrix laser scanning.

In order to achieve the above-mentioned purpose, the present disclosure provides a flow imaging system based on matrix laser scanning, including a laser source configured to generate continuous laser that irradiates a beam splitter component; the beam splitter component located downstream of the laser source, and configured to divide a single beam of laser received into multiple beams of laser with spatially angular dispersion or offset positions, wherein the multiple beams of laser are transmitted to an illumination objective; the illumination objective located downstream of the light splitter component, and configured to focus the multiple beams of laser and generate a two-dimensional matrix spots on a focal plane of the illumination objective; a fluid focusing component located downstream of the illumination objective, and configured to arrange dispersed cells to be imaged in a sample into a single cell axial flow, wherein when the cells pass through an illumination area of the two-dimensional matrix spots sequentially, the cells excite scattered light or fluorescence as signal light; a light collecting objective located downstream of the fluid focusing component, and configured to receive the signal light and transmit the signal light that is focused through a condenser to a photoelectric detector; the photoelectric detector located downstream of the light collecting objective, and configured to convert the signal light received into a voltage signal and send the voltage signal to a collecting card; the collecting card located downstream of the photoelectric detector, and configured to collect the voltage signal, convert the voltage signal into a corresponding digital signal through analog-to-digital conversion, and send the digital signal to a computer; and the computer located downstream of the collecting card, and configured to process the digital signal received to obtain an image of the cells imaged in the fluid focusing component.

Furthermore, the two-dimensional matrix spots scan and excite the cells in moving, a distance between the two-dimensional matrix spots in a direction parallel to a moving direction of a cell is greater than a length of the cell, and a position distribution of the two-dimensional matrix spots in a direction perpendicular to the moving direction of the cell covers different positions of the cell.

Furthermore, when the light collecting objective and the illumination objective are the same objective, a backward fluorescence detection optical path is formed. When the light collecting objective and the illumination objective are not the same objectives, a forward fluorescence detection optical path is formed.

Furthermore, the beam splitter component is one of a diffractive optical device splitting system, a spatial light modulator splitting system, a digital micromirror device splitting system, a multi-fiber beam splitting system, and a multi-splitter beam splitting system.

Furthermore, the diffractive optical device splitting system includes a diffractive optical device having a surface with an embossed structure. The spatial light modulator splitting system includes a spatial light modulator composed of a liquid crystal area array. The digital micromirror device splitting system includes a digital micromirror device being a digital micromirror array.

Furthermore, the fluid focusing component is a flow chamber of a traditional flow cytometer, or a microfluidic chip.

Furthermore, the photoelectric detector is one of a single photomultiplier tube, an avalanche phototube, a multi-channel fluorescence detection system or a spectrum detection system.

Furthermore, the flow imaging system further includes a confocal structure located upstream of the photoelectric detector.

The present disclosure provides a flow imaging method based on matrix laser scanning, including generating, by a laser source, continuous laser that irradiates a beam splitter component; dividing, by the beam splitter component, a single beam of laser received into multiple beams of laser with spatially angular dispersion or offset positions, wherein the multiple beams of laser are transmitted to an illumination objective; focusing, by the illumination objective, the multiple beams of laser and generating two-dimensional matrix spots on a focal plane of the illumination objective; arranging, by a fluid focusing component, dispersed cells to be imaged in a sample into a single cell axial flow, wherein when the cells pass through an illumination area of the two-dimensional matrix spots sequentially, the cells excite scattered light or fluorescence as signal light; receiving, by a collecting objective, the signal light and transmit the signal light that is focused through a condenser to a photoelectric detector; converting, by the photoelectric detector, the signal light received into a voltage signal and sending the voltage signal to a collecting card; collecting, by the collecting card, the voltage signal, convert the voltage signal into a corresponding digital signal through analog-to-digital conversion, and send the digital signal to a computer; and processing, by the computer, the digital signal received to obtain an image of the cells imaged in the fluid focusing component.

Furthermore, the method further includes forming a backward fluorescence detection optical path in response to determining that the light collecting objective and the illumination objective are the same objective; forming a forward fluorescence detection optical path is formed in response to determining that the light collecting objective and the illumination objective are not the same objectives.

BRIEF DESCRIPTION OF THE DRAWINGS

These and/or other aspects and advantages of embodiments of the present disclosure will become apparent and more readily appreciated from the following descriptions made with reference to the drawings, in which.

REFERENCE NUMERALS

1: laser source; 2: beam splitter; 3: illumination objective; 4: fluid focusing module; 5: light collecting objective; 6: photoelectric detector; 7: collecting card; 8: computer module; 9: laser beam; 10: diffractive optical device 10; 11: focusing lens; 12: projection plane; 13: spot array; 14: spatial light modulator; 15: digital micromirror device; 16: first optical fiber coupler; 17: beam fiber; 18: beam splitter; 19: reflector; 20: dichroic lens; 21: fluorescent objective; 22: focusing lens; 23: scattered light objective; 24: shading rod; 25: fluorescence detector; 26: scattered light detector; 27: fluorescence filter; 28: second optical fiber coupler; 29: optical fiber; 30: matrix spot; 31: scattered light and fluorescence objective; 32: notch filter; 33: aperture; 34: sheath fluid; 35: sample fluid; 36: detection area; 37: single-cell sample axial flow; 38: condenser.

DETAILED DESCRIPTION

Embodiments of the present disclosure are described in detail below, examples of which are shown in the drawings, and the same or similar reference numerals denote the same or similar elements or elements having the same or similar functions throughout. The embodiments described below by referring to the drawings are exemplary, and are intended to explain the present disclosure, and should not be construed as limiting the present disclosure.

A flow imaging system based on matrix laser scanning according to embodiments of the present disclosure will be described below with reference to the accompanying drawings.

Figure 1:
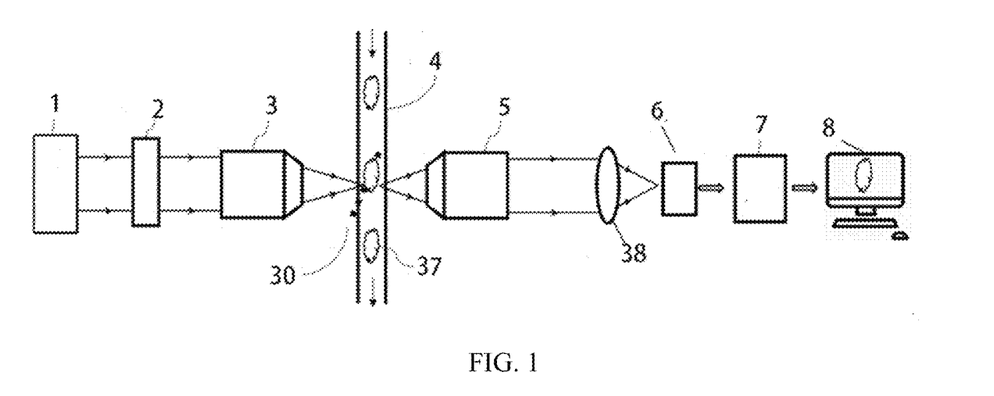
FIG. 1 is a schematic diagram showing a flow imaging system based on matrix laser scanning according to an embodiment of the present disclosure.

As shown in FIG. 1, the flow imaging system based on matrix laser scanning includes a laser source 1, a beam splitter module 2, an illumination objective 3, a fluid focusing module 4, a light collecting objective 5, a photoelectric detector 6, a collecting card 7, and a computer module 8.

The laser source 1 is configured to generate continuous laser, and the laser irradiates the beam splitter module 2.

The beam splitter module 2 is located downstream of the laser source 1, and the beam splitter module 2 is configured to divide a single beam of laser received into multiple beams of laser with spatially angular dispersion or offset positions. The multiple beams of laser are transmitted to an illumination objective 3.

The illumination objective 3 is located downstream of the beam splitter module 2, and configured to focus the multiple beams of laser and generate two-dimensional matrix spots 30 on a focal plane of the illumination objective 3.

The fluid focusing module 4 is located downstream of the illumination objective 3, and configured to arrange dispersed cells to be imaged in a sample into a single cell axial flow. When the cells pass through the illumination area of the two-dimensional matrix spot 30 sequentially, the cells excite and scattered light or fluorescence as signal light.

The light collecting objective 5 is located downstream of the fluid focusing module 4, and configured to receive the signal light and transmit the signal light that is focused through a condenser 38 to a photoelectric detector 6.

The photoelectric detector 6 is located downstream of the light collecting objective 5, and configured to convert the signal light received into a voltage signal and send the voltage signal to a collecting card 7.

The collecting card 7 is located downstream of the photoelectric detector 6, and configured to collect the voltage signal, convert the voltage signal into a corresponding digital signal through analog-to-digital conversion, and send the digital signal to a computer module 8.

The computer module 8 is located downstream of the collecting card 7, and configured to process the digital signal received to obtain an image of the cells imaged in the fluid focusing module 4.

The present disclosure changes a beam scanning system in a traditional laser scanning microscope into a laser beam splitter module, and changes a moving scanning beam into a static matrix scanning beam, such that the implementation process is simple. In addition, in a flow focusing system, a cell flow velocity is in the order of m/s, which may achieve the imaging flux of more than 10000 cells/s, making the imaging speed fast.

The laser source 1 is configured to generate continuous laser, and the laser irradiates the beam splitter module 2. The laser source 1 may be a commercial continuous laser source. Laser sources generally used in a flow cytometry has a wavelength of one or more of 355 nm, 375 nm, 405 nm, 488 nm, 530 nm, 561 nm and 640 nm. The laser has a power ranging from a few mW to hundreds of mW, and a beam of a Gaussian beam.

The beam splitter module 2 is configured to divide the single beam of laser received into multiple beams of laser with spatially dispersed or offset positions. The multiple beams of laser are transmitted to the illumination objective 3. The illumination objective 3 is configured to focus the multiple beams of laser. A two-dimensional matrix spot 30 is generated on the focal plane of the illumination objective 3. As shown in FIG. 2 to FIG. 6, the beam splitter module 2 has five implementation processes, including a diffractive optical device splitting system, a spatial light modulator splitting system, a digital micromirror device splitting system, a multi-fiber beam splitting system, and a multi-splitter beam splitting system.

Figure 2:
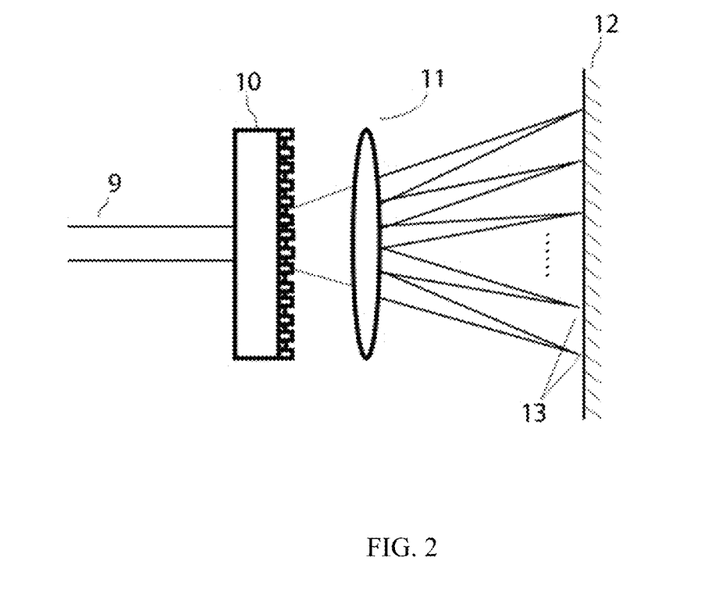
FIG. 2 is a schematic diagram showing a diffractive optical device beam splitting system generating matrix spots.

The diffractive optical device splitting system is shown in FIG. 2. The laser beam 9 is incident on the diffractive optical device 10. A surface of the diffractive optical device 10 has a micro-processed relief structure, which may modulate the phase of the incident light. The light modulated is divided into multiple laser beams with different angles in space from a single beam. The split multi-beams pass through the focusing lens 11 and are focused onto the projection plane 12 to form a spot array 13. The diffractive optical device 10 is equivalent to the beam splitter module 2. The focusing lens 11 is equivalent to the illumination objective 3. The projection plane 12 is equivalent to the plane through which cells flow in the fluid focusing module 4. The spot array 13 is equivalent to the matrix spot 30. Due to the design flexibility of the diffractive device, the method may generate any number of multi-spots.

Figure 3:
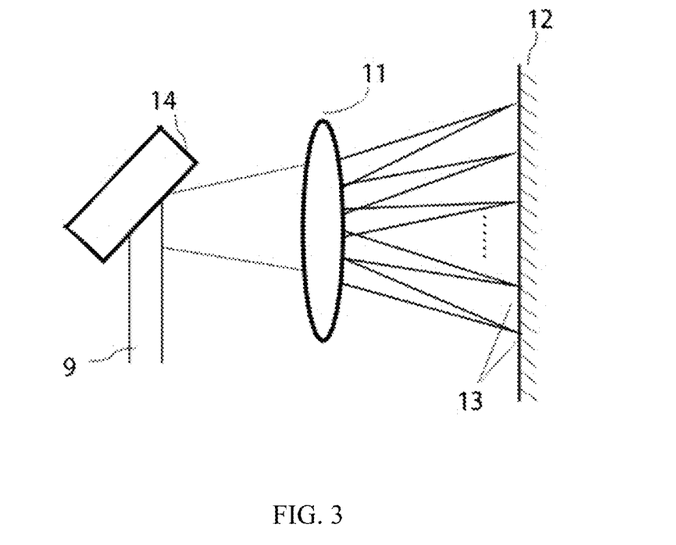
FIG. 3 is a schematic diagram showing a spatial light modulator beam splitting system generating matrix spots.

The spatial light modulator splitting system is shown in FIG. 3. The laser beam 9 is incident on a surface of the spatial light modulator 14. The spatial light modulator 14 is composed of a controllable liquid crystal array, and each individual pixel may be endowed with a specific phase delay, so as to obtain the same phase modulation effect as the diffractive optical device 10. The phase of the beam reflected by the spatial light modulator 14 is modulated, and the single beam is divided into multiple laser beams with different angles in space. The split laser beams pass through the focusing lens 11 and are focused onto the projection plane 12 to form a spot array 13. The spatial light modulator 14 is equivalent to the beam splitter module 2, and the corresponding relationship of other parts is the same as that of the parts of the diffractive optical device splitting system.

Figure 4:
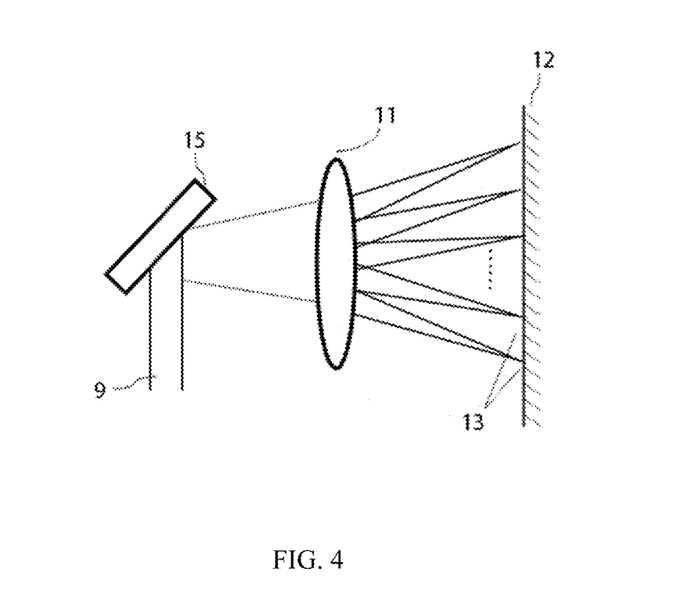
FIG. 4 is a schematic diagram showing a digital micromirror device splitting system generating matrix spots.

The digital micromirror device splitting system is shown in FIG. 4. The laser beam 9 is incident on a surface of the digital micromirror device 15. A digital micromirror device (DMD) 15 is a digital micromirror array, which is a kind of optical switch, and uses a rotating mirror to realize the opening and closing of the optical switch. The laser beam 9 shoots to the reflector of the DMD. When the DMD is turned on, the light may enter the other end through a symmetrical optical path. When the DMD is turned off, a reflector of the DMD produces a small rotation. The light cannot be reflected, and the other end after the light is reflected, so that the effect of turning off the optical switch is achieved. By controlling the switching mode of the DMD array, a grating-like diffractive structure may be formed on the surface, thereby realizing phase modulation of the incident light and separating the incident light into beams with different angles. The split laser beams pass through the focusing lens 11 and are focused onto the projection plane 12 to form a spot array 13. The digital micromirror device 15 is equivalent to the beam splitter module 2, and the corresponding relationship of other parts is the same as that of the diffractive optical device splitting system.

Figure 5:
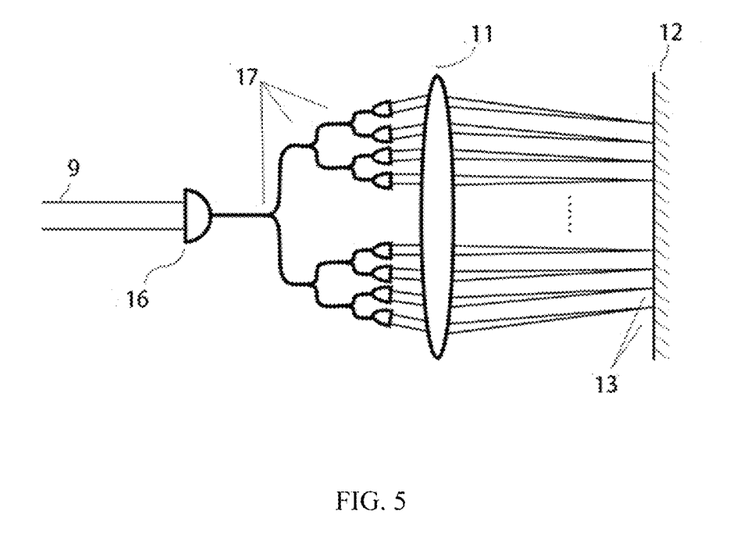
FIG. 5 is a schematic diagram showing a multi-fiber beam splitting system generating matrix spots.

The optical fiber splitting system is shown in FIG. 5. The laser beam 9 is incident on a first fiber coupler 16, and the optical fiber adopts a multi-stage beam splitting process to split the laser stage by stage. The light splitting of each stage is performed by using an optical fiber splitter. After the first-stage splitting of the beam fiber 17, two laser beams with an energy of ½ of the total energy are generated. After the second-stage splitting, four laser beams with an energy of ¼ of the total energy are generated. When n-stage splitting is performed, $2^n$ laser beams with energy of $½^n$ of the total incident energy (regardless of energy loss) are generated. The position and angle of the first fiber coupler 16 at the end may be adjusted for the split multi-beam laser beams to form multi-beams with specific distribution. The split multi-beams pass through the focusing lens 11 and are focused onto the projection plane 12 to form a spot array 13. The first optical fiber coupler 16 and the beam fiber 17 are equivalent to the beam splitter module 2, and the corresponding relationship of other parts is the same as that of the diffractive optical device splitting system.

Figure 6:
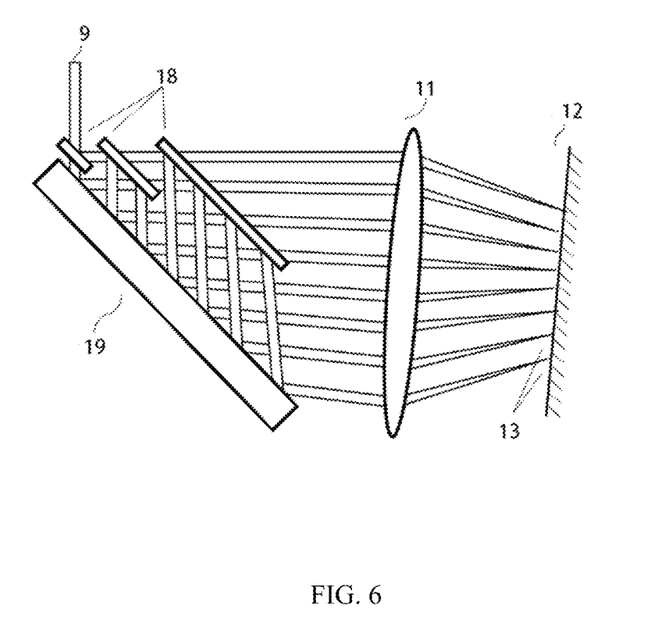
FIG. 6 is a schematic diagram showing a multi-splitter beam splitting system generating matrix spots.

The multi-beam splitter system is shown in FIG. 6. FIG. 6 shows a schematic diagram of 8-splitting of the laser beam in this manner, and adopts three-level splitting. A laser beam 9 is incident on the first-order beam splitter of beam splitter 18 (the leftmost beam splitter), half of the laser is directly projected, and half of the laser is reflected to the second-order beam splitter. The light projected through the first-order beam splitter is fully reflected by the reflector 19, and also reflected on the second-stage beam splitter. By analogy, after being split and reflected by the third-stage beam splitter, 8 beams of laser with ⅛ of the total light intensity will be finally generated. If n-level beam splitters are set, $2^n$ beams of laser with energy equal to $½^n$ of the total incident energy may be generated without considering energy loss. A slight angle is maintained between the reflector 19 and the plurality of beam splitters, and multiple beams of spatially different angles will be generated after the beams are reflected back and forth. The split multi-beams pass through the focusing lens 11 and are focused onto the projection plane 12 to form a spot array 13. The beam splitter mirror 18 and the reflector 19 are equivalent to the beam splitter module 2, and the corresponding relationship of other parts is the same as that of the diffractive optical device splitting system.

Figure 7A:
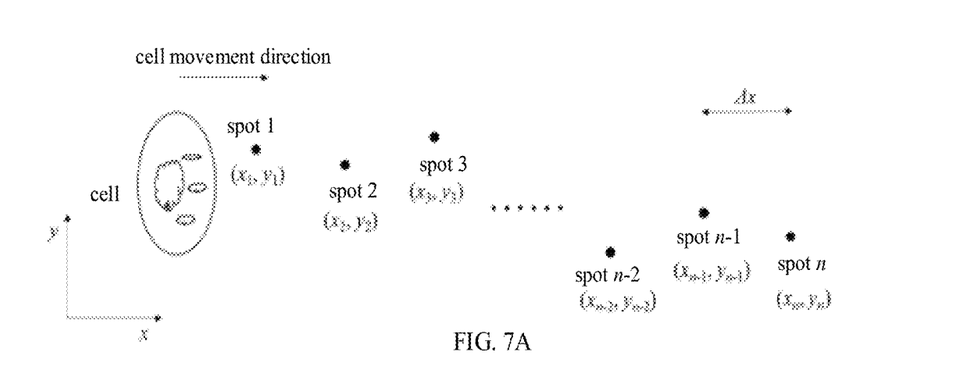
FIG. 7A is a schematic diagram showing two-dimensional matrix spots.

The two-dimensional matrix spot 30 scans and excites the cells in motion. A distance between the two-dimensional matrix spots 30 parallel to the direction of cell movement is greater than the length of the cell, and a position distribution of the two-dimensional matrix spots 30 perpendicular to the direction of cell movement covers different positions of the cells. The motion scanning of the two-dimensional matrix spot 30 is shown in FIG. 7. The beam splitter module 2 and the illumination lens may generate the two-dimensional matrix spot 30 on the plane of cell movement. As shown in FIG. 7A, there are a total of n spots on the plane, namely spot 1, spot 2, . . . , spot n. Assuming that the coordinates of these spots are $(x_1, y_1), (x_2, y_2), \ldots, (x_n, y_n)$, the position distribution of these spots satisfies the following conditions.

(1) In a direction of the cell flow, that is, in x direction, intervals of the spots are uniform and are all Δx: $\Delta x = x_i - x_{i-1}$, ($1 < i \leq n$).

(2) The interval Δx of the spots in x direction is required to be larger than a size of common cells of human, such as 20 to 30 μm, which may ensures that when the cells flow through, only one spot scans the cells at a time.

(3) Positions of the spots in y direction may be distributed arbitrarily, but it should cover all positions in y direction where the cells flow through with a certain density. That is, a set $\{y_i, 1 \leq i \leq n\}$ of the position of the spot in y direction constitutes a sample in a range of y positions where the cell flows through. In this way, every position expected to be sampled may be scanned by the spot when the cells flow through.

Figure 7B:
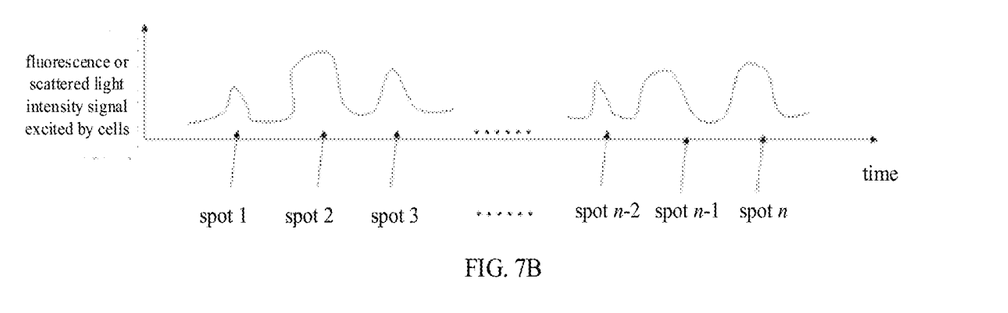
FIG. 7B is a schematic diagram showing fluorescence or scattered light signal excited by spots in FIG. 7A.
Figure 7C:
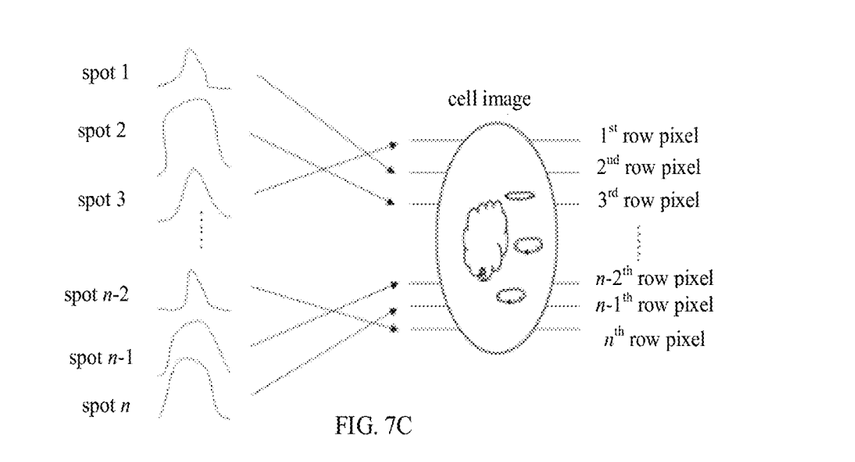
FIG. 7C is a schematic diagram showing a cell image recovered according to fluorescence intensity signal and scattered light intensity signal in FIG. 7B.

When the cells flow, the cells pass through the spot 1, the spot 2, . . . , the spot n respectively. The fluorescence or scattered light signal excited by the spot is shown in FIG. 7B. Since a distance between the spots in x direction is greater than a size of the cell, the signal appears as a discrete pulse in the time domain. A first pulse of the signal is excited by spot 1, indicating the fluorescence and scattering intensity distribution of the cell on the straight line at position $y_i$. The $i^{th}$ pulse in the signal is excited by spot i, indicating the fluorescence and scattering intensity distributions of the cell on a straight line at position $y_i$. FIG. 7C shows a schematic diagram of recovering the cell image according to the fluorescence intensity signal and the scattered light intensity signal. The signal excited by each spot is extracted separately, and the signal is rearranged according to the order of the position of the spot to obtain the image of the cell.

The two-dimensional matrix spot of the present disclosure is composed of laser spots specially arranged. The spot is projected onto the plane of the object to be imaged, and the cells move uniformly in the plane of the object to be imaged. The distance between the two-dimensional matrix spots parallel to the cell movement direction is greater than the length of the cell. The position distribution of the two-dimensional matrix spots perpendicular to the cell movement direction covers different positions of the cell, so that when the cell passes through the spot area, only one spot illuminates the cell at a time, so as to complete the progressive laser scanning of the cell by using the cell movement.

Figure 8A:
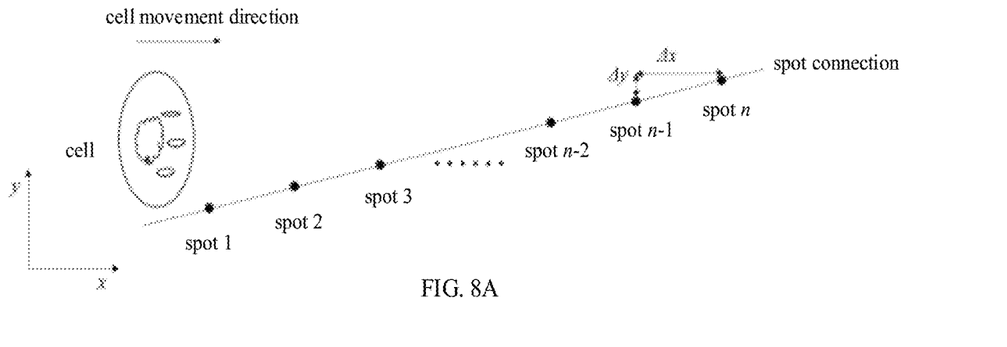
FIG. 8A is a schematic diagram showing one-dimensional matrix spots.
Figure 8B:
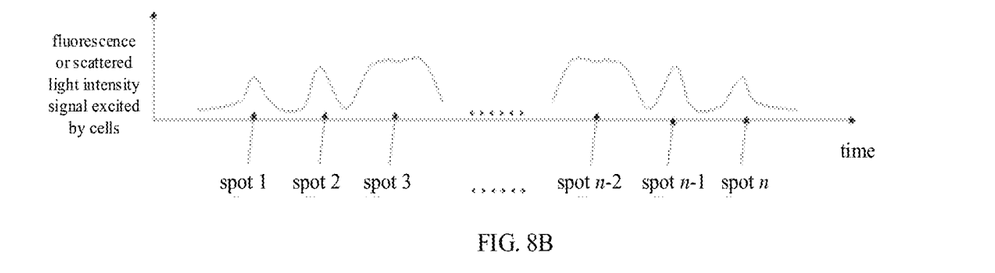
FIG. 8B is a schematic diagram showing fluorescence or scattered light signal excited by spots in FIG. 8A.
Figure 8C:
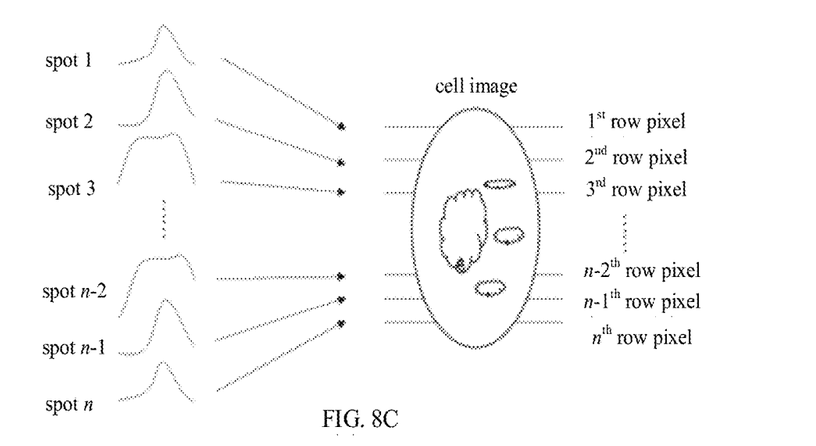
FIG. 8C is a schematic diagram showing a cell image recovered according to fluorescence intensity signal and scattered light intensity signal in FIG. 8B.

The one-dimensional linear matrix spot is a special example of the two-dimensional matrix spot 30, which has spots that are equally spaced in both x and y directions. The linear matrix spot scanning for cell movement is shown in FIG. 8. The beam splitter module 2 and the illumination lens may generate linear matrix spots on a plane of cell movement. As shown in FIG. 8A, the spots are located on a straight line with equal distances from each other, and there is a small angle between the direction of the cell movement and the direction of the connecting line of the spots. The direction of the cell movement is x-axis, and the direction perpendicular to the cell movement is y-axis. The distances between the linear matrix spots in x-direction and y-direction are Δx and Δy, respectively. Δx is required to be greater than the size of the cell, which may ensure that only one spot scans the cell at a time during the cell movement. According to the size of common human cells, Δy is generally determined as 20 to 30 μm. When the cells pass through spot 1, spot 2, . . . , spot n in turn, the fluorescence signal and the scattered light signal are respectively excited, and the light signals appear as a series of pulses in time, as shown in FIG. 8B. Each pulse contains a fluorescence intensity distribution and a scattering intensity distribution at the corresponding position of the cell. FIG. 8C shows a schematic diagram of recovering the cell images based on the fluorescence intensity signals and the scattered light intensity signals. The pulse signals at fixed intervals are extracted respectively and rearranged to obtain the cell images.

Figure 9:
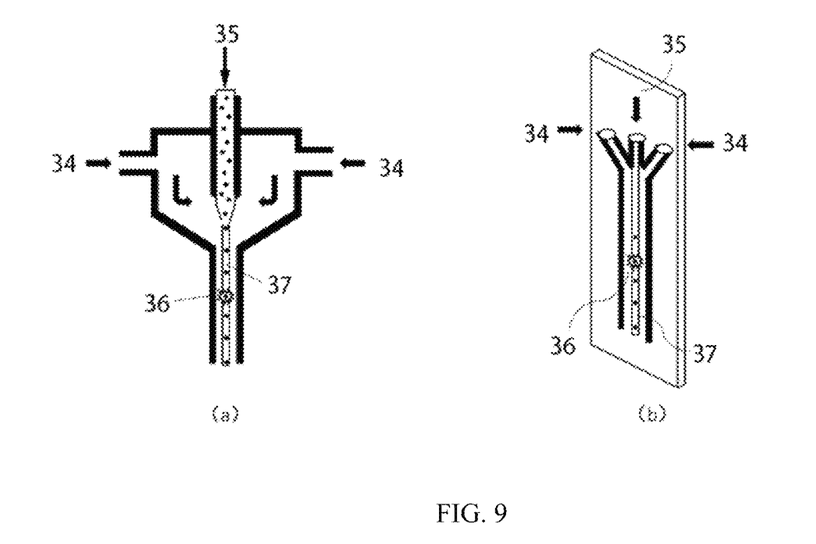
FIG. 9 is a schematic diagram showing a flow chamber of traditional flow cytometry and flow focusing based on microfluidics.

The fluid focusing module 4 is configured to arrange the dispersed cells to be imaged in the sample into a single cell axial flow, and when the cells pass through the illumination area of the two-dimensional matrix spot 30 sequentially, the cells excite scattered light or fluorescence as signal light. The fluid focusing module 4 adopts a traditional flow cytometer flow chamber or a microfluidic chip. The first focusing process is to use the focusing module of the flow cell of the traditional flow cytometer. FIG. 9A shows a cross-section of the fluid circuit diagram. The process adopts a hydrodynamic manner for focusing, in which sheath fluid 34 flows around sample fluid 35, and forms a single-cell sample axial flow 37 after being constrained by the conical shape of the focusing part. The single-cell sample axial flow 37 corresponds to a row of cells in FIG. 1 (the two vertical lines indicate the boundary of the axial flow). The cells contained in the axial flow pass through a detection area 36 one by one after focusing. In the detection area 36, the cells are illuminated by the matrix spot 30, and the excitation light generated by the cells is collected by the light collecting objective 5 and sent to the photoelectric detector 6 for detection. After being collected by the collecting card 7, the excitation light is transmitted to the computer module 8, and the cell image is restored by the computer module 8. A second focusing process is to use a microfluidic chip for focusing, as shown in FIG. 9B. The microfluidic chip uses microchannels for focusing. The sheath liquid 34 is injected into the chip from two microchannels, and the sample solution 35 is injected from the center at the same time. Under the fluid compression of the two sheath fluids 34, the sample flow is transformed into a constant single-cell sample axial flow 37. The single-cell sample axial flow 37 corresponds to a column of cells in FIG. 1 (the two vertical lines indicate the axial flow boundaries). In the detection area 36, the cells are illuminated by the matrix spots 30. After the cells pass through the detection area 36, the cells are scanned by the spots to detect the images of the cells. The light collecting objective 5 is configured to receive the signal light, and the signal light is transmitted to the photoelectric detector 6. The condenser 38 focuses the signal light onto a photosensitive surface of the photoelectric detector 6. The photoelectric detector 6 is configured to convert the signal light received into a voltage signal, and sends the voltage signal to the collecting card 7. The collecting card 7 is configured to collect and converts the voltage signal into a corresponding digital signal through analog-to-digital conversion. The digital signal is sent to the computer module 8. The computer module 8 is configured to process the digital signal received to obtain the image of the imaged cell in the fluid focusing module 4. There are no special parameters and model requirements for the illumination objective 3 and the light collecting objective 5. The illumination objective 3 is used for spot focusing, and the light collecting objective 5 is used for collection of the fluorescence and the scattered light. The light collecting objective 5 may be the same objective as the illumination objective 3, or may not be the same objectives. When the light collecting objective 5 is the same objective as the illuminating objective 3, a back-facing fluorescence detection optical path is formed. When the light collecting objective 5 and the illuminating objective 3 are not the same objective, a forward fluorescence detection optical path is formed. The photoelectric detector 6 may be a photomultiplier tube (PMT) or an avalanche photodiode (APD) or other detectors, or may be externally connected with multiple optical paths for fluorescence detection and spectrum detection. The multi-channel fluorescence detection system is a standard configuration of a commercial flow cytometer, which consists of a series of dichroic mirrors and filters with different cut-off wavelengths and multiple different PMTs to form multiple fluorescence detection channels. Multiple fluorescence detection channels are responsible for the detection of different fluorochromes. The spectral detection system is a detection system used in the spectral flow cytometer, and is composed of a spectral beam splitter device and an array photomultiplier tube (PMT). In addition, both the collecting card 7 and the computer module 8 may be conventional models, which have no special model requirements.

The imaging method combined with microfluidic technology has advantages of completely closed and pollution-free detection.

The present disclosure combines a multi-channel fluorescence detection system and a spectral detection system to achieve multi-color flow imaging and spectral flow imaging, such that the present disclosure is scalable.

Figure 10:
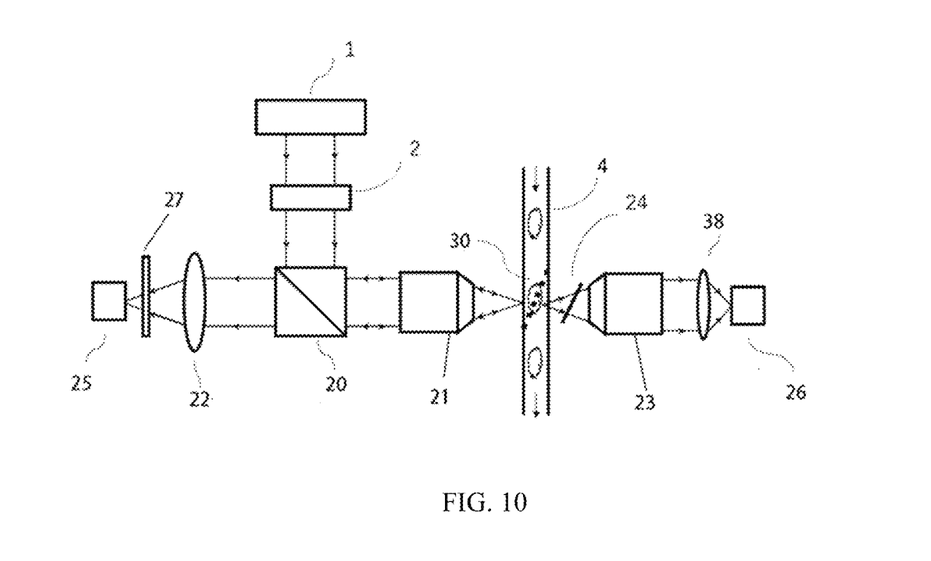
FIG. 10 is a schematic diagram showing a flow imaging system based on matrix laser scanning in an embodiment of the present disclosure.

In an embodiment, a system of back-facing fluorescence detection light path and forward scattered light detection light path is used as shown in FIG. 10. The laser source 1 emits laser, which is split into a dichroic mirror 20 through the beam splitter module 2. A cut-off wavelength of the dichroic mirror 20 is longer than a wavelength of the laser source 1 and shorter than a wavelength of the cell-excited fluorescence. The light beam is reflected to the fluorescent objective 21 through the dichroic mirror 20, and the light reflected to the fluorescent objective 21 should be a light beam that is spatially shifted by a small angle or a small distance. The fluorescent objective 21 serves as the illuminating objective 3 and the light collecting objective 5. After the light beam is focused by the fluorescent objective 21, the matrix spot 30 is formed at a center of the fluid focusing module 4. The cells are labeled with fluorescent dyes or fluorescent proteins, and are excited by the laser spot to produce fluorescence. When the cells pass through the matrix spot 30, a series of fluorescent signals are excited. Since the fluorescence wavelength is longer than the cut-off wavelength of the dichroic mirror 20, the fluorescence entering the fluorescence objective 21 passes through the dichroic mirror 20 and enters the subsequent optical path. Fluorescence is collected onto a fluorescence detector 25 through a condenser 22. The fluorescence detector 25 may be detected by a photomultiplier tube (PMT). At the same time, a fluorescence filter 27 is placed in front of the fluorescence detector 25. The fluorescence filter 27 allows only the fluorescence signals within the emission wavelength range of the cells to enter the fluorescence detector 25. The signal detected by the fluorescence detector 25 may be used to restore the fluorescence intensity at different positions of the cell.

A right part of the optical path of the fluid focusing module 4 is an optical path for detecting scattered light. A light-shielding rod 24 is located in front of the scattered light objective 23, and the light-shielding rod 24 shields most of the original laser. When the cells flow through the matrix spot 30, the scattered light will be collected by the scattered light objective 23 and enter the scattered light detector 26 through the condenser 38. The signal detected by the scattered light detector 26 may be used to recover the scattering intensity of each position of the cell.

In the embodiment, the imaged fluorescence image reflects distribution of intracellular fluorescent dyes or fluorescent molecules, and the scattering intensity image reflects the intensity of intracellular scattering media, such as organelles, cell nuclei and other scattering media.

Figure 11:
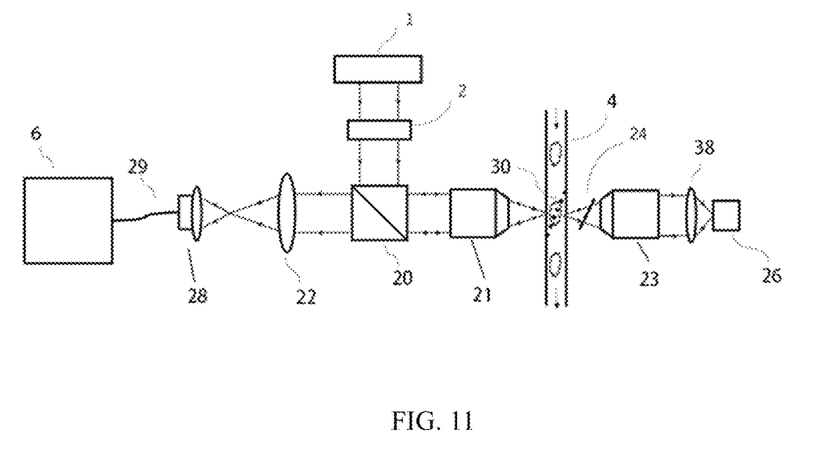
FIG. 11 is a schematic diagram showing a flow imaging system based on matrix laser scanning in an embodiment of the present disclosure.

In an embodiment, a system of back-facing fluorescence detection optical path and forward scattered light detection optical path is used as shown in FIG. 11. A structure on the right side of the fluid focusing module 4 is the same as that in the above-mentioned embodiments.

A left side of the fluid focusing module 4 is a spot illumination and back-facing fluorescence detection structure. The laser source 1 emits laser, which is split into the dichroic mirror 20 through the beam splitter module 2. The cut-off wavelength of the dichroic mirror 20 is longer than the wavelength of the laser source 1 and shorter than the wavelength of the cell-excited fluorescence. The light beam is reflected to the fluorescent objective 21 through the dichroic mirror 20, and the light reflected to the fluorescent objective 21 should be a light beam that is spatially shifted by a small angle or a small distance. The fluorescence objective 21 corresponds to the illumination objective 3 in FIG. 1, and is equivalent to the light collection objective 5 in FIG. 1, which is used for illuminating and collecting fluorescence at the same time. After the light beam is focused by the fluorescent objective 21, the matrix spots 30 are formed at the center of the fluid focusing module 4. Cells are labeled with fluorescent dyes or fluorescent proteins, which may be excited by the laser spot to produce fluorescence. When the cells pass through the matrix spot 30, a series of fluorescent signals are excited. Since the fluorescence wavelength is longer than the cut-off wavelength of the dichroic mirror 20, the fluorescence entering the fluorescence objective 21 passes through the dichroic mirror 20 and enters the subsequent optical path. The fluorescence signal may enter the optical fiber 29 after passing through the condenser 22 and the second fiber coupler 28, and then transmit to the photoelectric detector 6 through the optical fiber 29. The photoelectric detector 6 is a multi-channel fluorescence detection system or a spectrum detection system.

The spectrum detection system may obtain cell images in various spectral bands, to effectively avoid the effect of fluorescence aliasing and improve the detection information.

Figure 12:
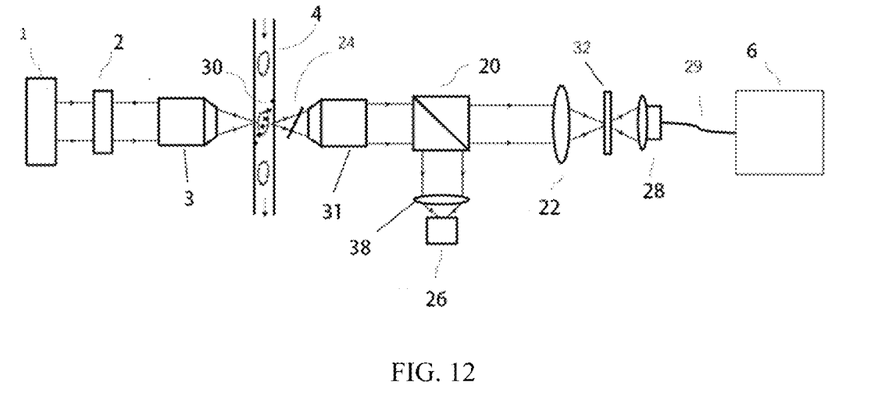
FIG. 12 is a schematic diagram showing a flow imaging system based on matrix laser scanning in an embodiment of the present disclosure.

In an embodiment, a system of forward fluorescence detection optical path and forward scattered light detection optical path is used, which is suitable for the optical path of multicolor laser excitation, as shown in FIG. 12. Since a fluorescent signal of a short-wavelength laser may overlap with a band of another long-wavelength laser when using a back-facing detection structure, the forward-facing fluorescence detection structure is more suitable for the optical path excited by multicolor lasers.

The left side of the fluid focusing module 4 is the illumination light path. The laser source 1 generates laser with single or multiple continuous wavelengths, and after passing through the beam splitter module 2 and the illumination objective 3, the matrix spots 30 are formed in the center of the fluid focusing module 4. When the cells in the fluid focusing module 4 flow through the matrix spot 30, the fluorescent signals and scattered light signals are excited. After the illumination laser is shielded by the light-shielding rod 24, the illumination laser will not enter the subsequent detection system, but the fluorescence signal and scattered light signal will be collected by the scattered light and fluorescence objective 31, which corresponds to the light collecting objective 5 in FIG. 1. The scattered light and fluorescence signals enter the dichroic mirror 20. The cut-off wavelength of the dichroic mirror 20 is higher than the shortest wavelength of the laser, and shorter than other wavelengths of laser and fluorescence. The scattered light is reflected by the dichroic mirror 20 to the scattered light detector 26 for scattering imaging of cells. The light passing through the dichroic mirror 20 includes other long-wavelength lasers and fluorescence of various wavelengths excited by the lasers. This part of light enters the optical fiber 29 through the condenser 22 and the second fiber coupler 28. Other long-wavelength lasers are unnecessary optical signals, which are filtered by the notch filter 32, and then passed through the notch filter. The light after 32 contains only the desired fluorescent signal. This part of the fluorescence is transmitted to the photoelectric detector 6 through the optical fiber 29, and the photoelectric detector 6 is a multi-channel fluorescence detection system or a spectrum detection system. The embodiment is suitable for multi-laser excitation imaging, which has more imageable wavelength bands, and may provide more imaging information.

Figure 13:
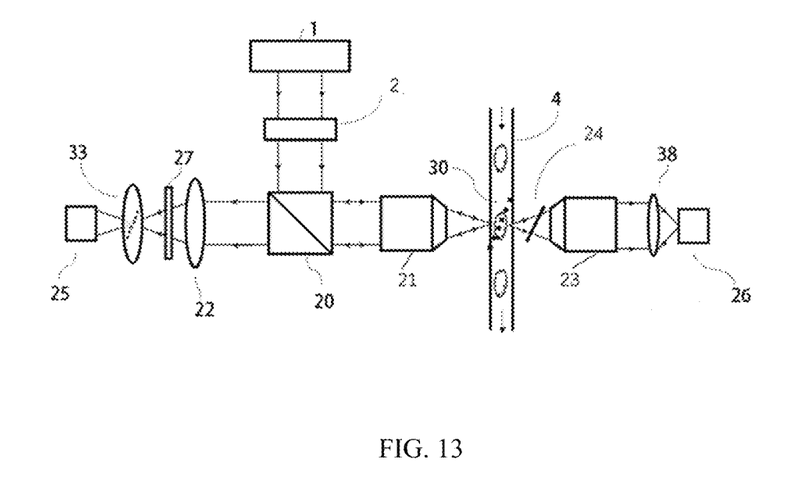
FIG. 13 is a schematic diagram showing a flow imaging system based on matrix laser scanning in an embodiment of the present disclosure.

In an embodiment, a confocal structure is added to the imaging system to improve the resolution of the system, as shown in FIG. 13. In an embodiment, an aperture 33 is added behind the fluorescence filter 27, and the fluorescence enters the fluorescence detector 25 after passing through the aperture 33. The aperture 33 and the matrix spot 30 in the optical path form a confocal structure. Specifically, the fluorescence excited by the matrix spot 30 is collected by the fluorescence objective 21, passes through the dichroic mirror 20, and then passes through the condenser 22 to focus on the plane where the aperture 33 is located. Since the plane where the matrix spot 30 is located and the plane where the aperture 33 is located are conjugate planes, the fluorescence excited by the matrix spot 30 may form a fluorescent spot on the plane where the aperture 33 is located. The aperture 33 is provided to allow the light at a position of the conjugate image of the matrix spot 30 to pass through, while shielding the light at other positions, thus forming a confocal structure. The confocal structure may only allow the fluorescence excited at the position of the spot of the matrix spot 30 to pass through the aperture, while the fluorescence excited at other positions on the focal plane or at positions outside the focal plane is blocked, thereby improving contrast, resolution and image quality of the system.

The embodiment is suitable for improving the imaging resolution and imaging quality, and the imaging system with the aperture 33 may improve the imaging effect of the confocal microscope under the same conditions.

The confocal structure is located upstream of the photoelectric detector to improve the imaging resolution and imaging quality.

Figure 14:
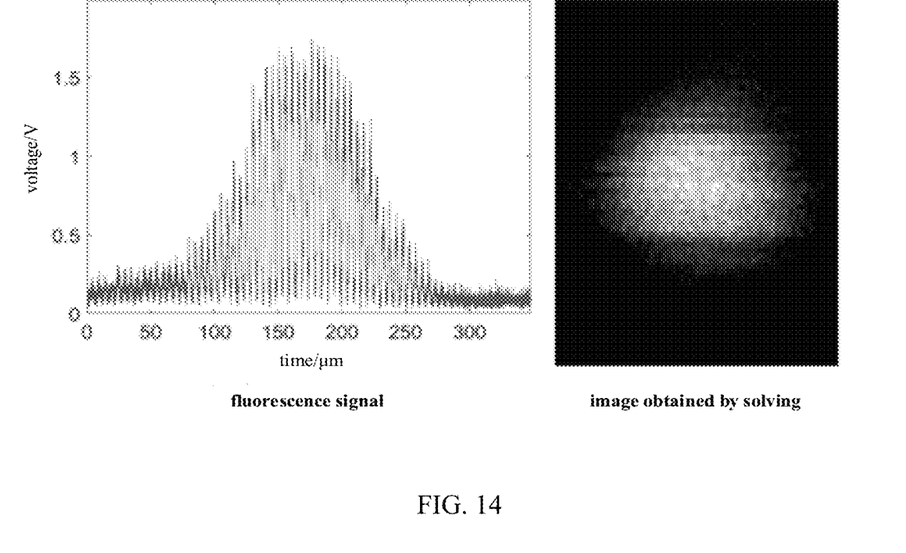
FIG. 14 is a picture obtained by analyzing a fluorescence signal of 10 μm microsphere.
Figure 15:
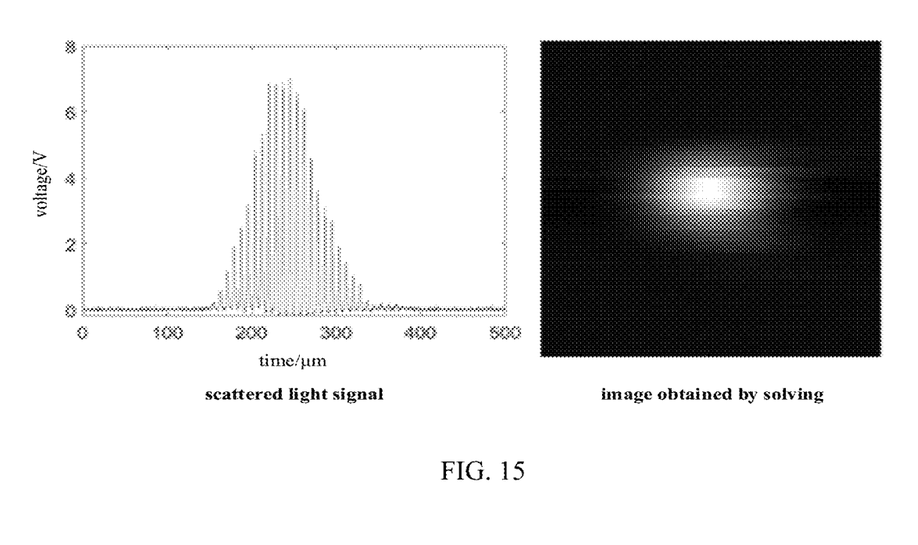
FIG. 15 is a picture obtained by analyzing a scattered light signal of 10 μm microsphere.

FIG. 14 and FIG. 15 show embodiments of actual system scanning imaging, which adopts a system of back-facing fluorescence detection light path and forward scattered light detection light path. The beam splitter module 2 adopts a diffractive optical device beam splitter system. FIG. 14 shows the signal and image of fluorescence imaging of 10 μm microspheres, and FIG. 15 shows the original signal and image of scattered light of 10 μm microspheres. The 10 μm microspheres flow in the focusing chip at a speed of 4.8 m/s. After the laser beam is split by the diffractive optical device 10, the microspheres are focused to a center of the flow channel by the objective. Fluorescence excited in the center of the flow channel is detected by a back-detection optical path, and scattered light is detected by a forward-detection optical path. Both back fluorescence and forward scattered light are detected by a photomultiplier tube (PMT), and the signal is sampled by the collecting card 7 with a maximum sampling rate of 200 MHz.

The present disclosure provides a flow imaging method based on matrix laser scanning, including generating, by a laser source, continuous laser that irradiates a beam splitter component; dividing, by the beam splitter component, a single beam of laser received into multiple beams of laser with spatially angular dispersion or offset positions, wherein the multiple beams of laser are transmitted to an illumination objective; focusing, by the illumination objective, a the multiple beams of laser and generating two-dimensional matrix spots on a focal plane of the illumination objective; arranging, by a fluid focusing component, dispersed cells to be imaged in a sample into a single cell axial flow, wherein when the cells pass through an illumination area of the two-dimensional matrix spots sequentially, the cells excite scattered light or fluorescence as signal light; receiving, by a collecting objective, the signal light and transmit the signal light that is focused through a condenser to a photoelectric detector; converting, by the photoelectric detector, the signal light received into a voltage signal and sending the voltage signal to a collecting card; collecting, by the collecting card, the voltage signal, convert the voltage signal into a corresponding digital signal through analog-to-digital conversion, and send the digital signal to a computer; and processing, by the computer, the digital signal received to obtain an image of the cells imaged in the fluid focusing component.

Furthermore, the method further includes forming a backward fluorescence detection optical path in response to determining that the light collecting objective and the illumination objective are the same objective; forming a forward fluorescence detection optical path is formed in response to determining that the light collecting objective and the illumination objective are not the same objectives.

Compared with the related art, the technical effects of the present disclosure is as follows. The flow imaging system based on the matrix laser scanning of the present disclosure adopts the disclosure laser spot to scan the moving cells, and finally adopts the photoelectric detector to detect the fluorescence or the scattered light excited by the cells, and adopts the measured signal to obtain the cell image, which has simple implementing process, high reliability, high imaging quality, and is easy to integrate with high imaging flux.

In the description of this specification, the reference term "an embodiment," "some embodiments," "an example," "a specific example," or "some examples," means that a particular feature, structure, material, or characteristic described in connection with the embodiment or example is included in at least one embodiment or example of the present disclosure. In this specification, the above-mentioned terms in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine different embodiments or examples and features of different embodiments or examples described in this specification without conflicting with each other.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Although explanatory embodiments of the present disclosure have been shown and described, it would be appreciated by those skilled in the art that various changes, modifications, substitutions and modifications can be made to these embodiments without departing from the principle and spirit of the present disclosure, and the scope of the present disclosure is defined by the claims and their equivalents.

What is claimed is:

1. A flow imaging system based on matrix laser scanning, comprising:
    a laser source configured to generate continuous laser that irradiates a beam splitter component;
    wherein the beam splitter component is located downstream of the laser source and is configured to divide a single beam of laser received into multiple beams of laser with spatially angular dispersion or offset positions, wherein the multiple beams of laser are transmitted to an illumination objective;
    wherein the illumination objective is located downstream of the beam splitter component, and is configured to focus the multiple beams of laser and generate two-dimensional matrix spots on a focal plane of the illumination objective;
    a fluid focusing component located downstream of the illumination objective, and configured to arrange dispersed cells to be imaged in a sample into a single cell axial flow, wherein when the dispersed cells pass through an illumination area of the two-dimensional matrix spots sequentially, the dispersed cells excite scattered light or fluorescence as signal light, wherein the two-dimensional matrix spots scan and excite the dispersed cells in moving, a distance between the two-dimensional matrix spots in a direction parallel to a moving direction of a cell is greater than a length of the cell, and a position distribution of the two-dimensional matrix spots in a direction perpendicular to the moving direction of the cell covers different positions of the cell;
    a light collecting objective located downstream of the fluid focusing component, and configured to receive the signal light and transmit the signal light that is focused through a condenser to a photoelectric detector;
    wherein the photoelectric detector is located downstream of the light collecting objective and is configured to convert the signal light received into a voltage signal and send the voltage signal to a collecting card;
    wherein the collecting card is located downstream of the photoelectric detector and is configured to collect the voltage signal, convert the voltage signal into a corresponding digital signal through analog-to-digital conversion, and send the digital signal to a computer; and
    wherein the computer is located downstream of the collecting card and is configured to process the digital signal received to obtain an image of the dispersed cells imaged in the fluid focusing component.

2. The system according to claim 1, wherein:
    when the light collecting objective and the illumination objective are the same objective, a backward fluorescence detection optical path is formed; and
    when the light collecting objective and the illumination objective are not the same objective, a forward fluorescence detection optical path is formed.

3. The system according to claim 2, wherein the beam splitter component is one of a diffractive optical device splitting system, a spatial light modulator splitting system, a digital micromirror device splitting system, a multi-fiber beam splitting system, and a multi-splitter beam splitting system.

4. The system according to claim 3, wherein:
    the diffractive optical device splitting system comprises a diffractive optical device having a surface with an embossed structure;
    the spatial light modulator splitting system comprises a spatial light modulator composed of a liquid crystal area array; and
    the digital micromirror device splitting system comprises a digital micromirror device being a digital micromirror array.

5. The system according to claim 4, wherein the fluid focusing component is a flow chamber of a traditional flow cytometer, or a microfluidic chip.

6. The system according to claim 5, wherein the photoelectric detector is one of a single photomultiplier tube, an avalanche phototube, a multi-channel fluorescence detection system and a spectrum detection system.

7. The system according to claim 6, further comprising a confocal structure located upstream of the photoelectric detector.

\* \* \* \* \*